Aug. 4, 1942. T. A. BOWERS 2,292,042
INCLINED PISTON RING
Filed Oct. 2, 1939

Inventor
Thomas A. Bowers
by
Attorney

Patented Aug. 4, 1942

2,292,042

UNITED STATES PATENT OFFICE 2,292,042

INCLINED PISTON RING

Thomas A. Bowers, Boston, Mass., assignor to Power Research Corporation, Boston, Mass., a corporation of Massachusetts Application October 2, 1939, Serial No. 297,537

8 Claims. (Cl. 309—44)

This invention relates to piston rings and more especially to compressing piston rings fabricated from piston ring material.

In fabricating a piston ring from a strip of piston ring material, it is customary to reversely fold the strip upon itself and compact it into a substantially fluid-tight body. The folded portions of the strip comprise the top and bottom sides of the ring and consist of rounded crowns. The inner and outer peripheries of the ring consist of flat sides made up of adjacent edges of the strip of material. In addition to the ring presenting an outer periphery capable of engaging against a cylinder periphery and effecting a seal therewith, the ring must be provided with flat top and bottom surfaces for alternately engaging against and sealing on the top or bottom sides of a piston groove in which the ring is received. It is, therefore, necessary to form the rounded tops and bottoms into substantially flat surfaces. This requires expensive forming operations and further is open to the objection that unless special steps are taken to thicken the strip of material at those points at which it is flattened, undesirable weaknesses are developed.

It is a principal object of the present invention to improve piston rings of the fabricated type and to devise a reversely folded ring structure having flat top and bottom surfaces which may be cheaply effected. It is a further object of the invention to provide a ring structure which is capable of resisting pressure exerted at its back portions with a view to reducing cylinder wear and increasing the efficiency and life of both the ring and the cylinder against which it engages.

Attainment of these and other objects of the invention will be readily understood from the following description when read in connection with the accompanying drawing, and the novel features will be more particularly pointed out in the appended claims.

Figure 2:
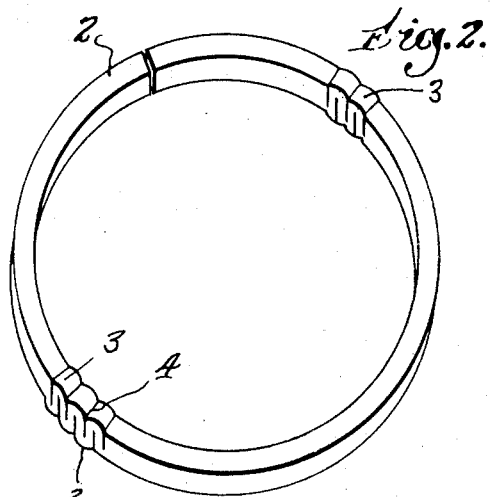
Fig. 2 is a perspective view of a piston ring formed from the folding operation indicated in Fig. 1.

In the construction shown, 1 denotes a strip of piston ring material employed in carrying out my invention. The strip may be composed of any suitable material as for instance steel, alloy or other substances. By reversely folding the strip as shown and compacting it upon itself, an annular body or ring 2 may be effected, as illustrated in Fig. 2, in which it will be noted that the folded portions comprise crowns 3 forming the top and bottom sides of the ring. The ring 2 occurs with interstices or openings 4 occurring between the bent portions, and the strip 1 will preferably be composed of a resilient material such that when the bent portions are compressed upon one another closing up the interstices 4, the ring tends to spring open and exerts a uniform radial pressure useful in engaging the ring against the wall of a cylinder. However, the rounded character of the crowns 3 at the top and bottom of ring 2 prevent effective sealing of the top sides of the ring in its piston groove and it is necessary that this condition be corrected and substantially flat bearing surfaces provided.

Figure 3:
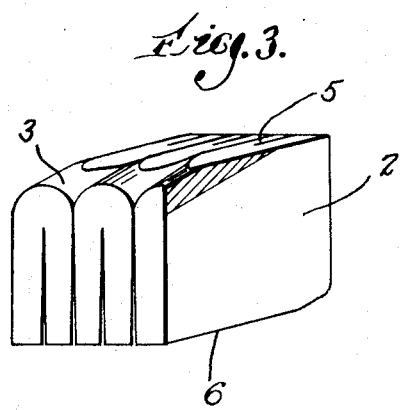
Fig. 3 is a fragmentary perspective view illustrating a cutting operation effected on a ring similar to that shown in Fig. 2.

According to the present invention, flat surfaces are effected at the top and bottom sides of the ring by cutting away portions of the crowns 3, as for example in the manner illustrated in Fig. 3. Any suitable cutting operation, as turning, may be resorted to, to effect a flat surface 5 at the top of the ring and a similarly flat surface 6 at the bottom side of the ring. The cutting will extend angularly across the top of the ring from a point within its outer periphery to the inner periphery, and similarly at its under side a cutting will extend across the bottom of the ring from a point within the inner periphery to the outer periphery. It will be noted that by this means there are effected parallel bearing surfaces at the top and bottom of the ring 2, and the reversely folded structure is held together at the front and back by the remaining crown portions.

It will also be noted that the bearing surfaces occur angularly with respect to the axis of the ring. To support such a ring there has been provided a piston 7 mounted in a cylinder 8 and constructed with an angularly occurring piston groove 9 for supporting the ring 2. The groove sides 10 and 11 have a degree of angularity corresponding to that of the turned surfaces 5 and 6 of the ring 2, so that effective sealing of the ring against the groove occurs in accordance with the direction of the piston stroke.

Figure 4:
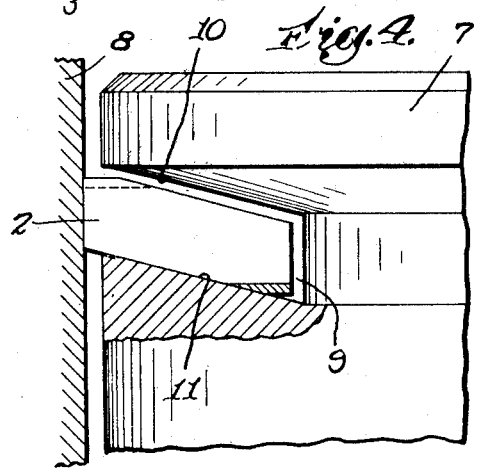
Fig. 4 is a view in elevation and partial cross section illustrating a ring such as that shown in Fig. 3 associated with a piston and cylinder.

By the means shown, bearing surfaces for a ring of reversely folded material are very cheaply and simply effected with crown portions of original strip thickness being retained to adequately preserve the strength of the ring. Also these crown portions occur in such a manner as to no longer be subjected to wear from slapping in a piston groove, as may be more clearly seen in Fig. 4.

A further advantage is derived from the angular disposition of the ring in the piston. It will be noted that the ring is inclined downwardly toward the axis of the piston, and in order to be expanded against the periphery of the cylinder 8, it must move upwardly, which requires much more force than would be the case if the ring were horizontally supported in the piston groove. An immediate result is that the ring offers resistance to combustion gas pressure which, when exerted at the inner periphery of the ring, tends to expand the ring in varying degrees of intensity against the cylinder wall. The reason for there being resistance is due to the fact that the gas pressure acts downwardly on the top of the ring, as well as in back of it, and tends to move the ring downwardly away from the cylinder wall. This pressure opposes pressure at the back of the ring and must be overcome before any substantial increase in wall pressure of the ring on its cylinder may occur. By reducing the effect of back pressure tending to expand the ring against the cylinder, wear on the cylinder is reduced, and particularly that wear resulting from fluctuation of gas pressure usually referred to as "tapered" cylinder wear.

Figure 1:
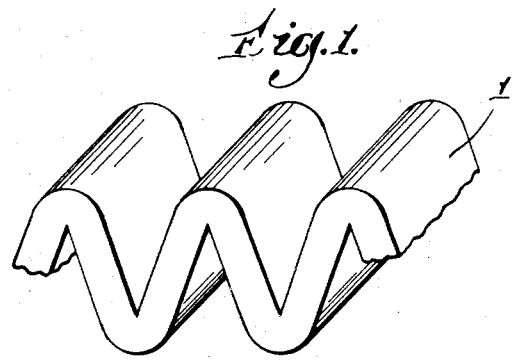
Fig. 1 is a fragmentary perspective view of a strip of piston ring material illustrating a first step in carrying out the invention.
Figure 5:
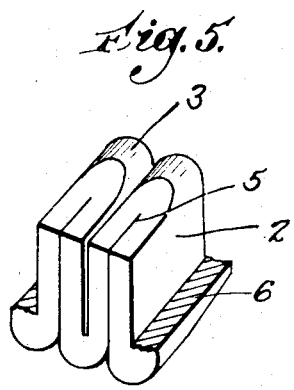
Fig. 5 is another fragmentary perspective view further illustrating the recessed character of a ring similar to that effected in Fig. 3.
Figure 6:
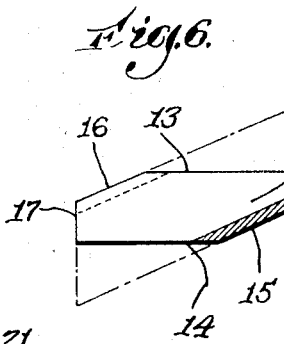
Fig. 6 is a symmetrical cross section of a piston ring modification.
Figure 7:
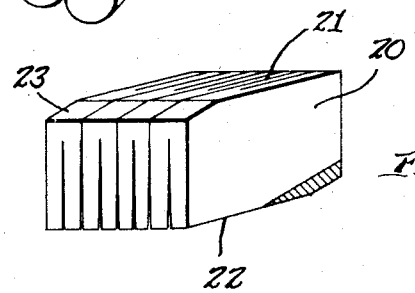
Fig. 7 is an assembly view illustrating a ring similar to that shown in Fig. 6 mounted in a piston groove.

In Figs. 6 and 7 I have shown a ring structure similar in some respects to that illustrated in Fig. 5. To effect this ring structure, a strip of material is treated in the manner generally illustrated in Figs. 1 and 2, with the further step of forming a ring such as that shown in Fig. 2 with its top and bottom sides occurring in an angular manner.

Fig. 6 is a cross section showing a "dished" ring 12 having inclined top and bottom sides which have been cut away in the manner illustrated in Fig. 3 to provide flat surfaces 13 and 14, there remaining unchanged crown portions 15 and 16. It will be seen that this ring is similar in many respects to the ring shown in Fig. 3. However, its recessed surfaces 13 and 14 occur horizontally with relation to the outer periphery 17 of the ring so that the ring 12 may be horizontally disposed in a conventional horizontal groove 18 of a piston 19, as shown in Fig. 7. The advantage of this construction consists in the elimination of inclined piston ring groove sides.

Figure 8:
Fig. 8 is a fragmentary perspective view of another piston ring modification.

If desired, the step of cutting away portions of a reversely folded structure may be effected with various other types of fabricated structures, as for example in Fig. 8 there is illustrated a ring 20 having cut away flat surfaces 21 and 22 formed in the flattened crowns 23. In such a construction, the advantage of eliminating flattening of the crowns is not present but the resistance to gas pressure effected by angularly supporting a ring structure in a piston groove is separately attained.

It will be seen that a fabricated ring having novel features has been provided and the ring is more efficient in operation, as quickly and cheaply made and designed to present increased resistance to wear. Also, a structure for resisting fluctuating gas pressures has been provided which effects substantial reduction in cylinder and ring wear.

While I have shown preferred embodiments of my invention, various changes may be resorted to in keeping with the spirit of the invention.

I claim:

1. A piston ring comprising a length of piston ring material reversely folded upon itself to present crowns and connecting web portions, said crowns comprising the top and bottom sides of the said ring, said crowns and webs being cut away throughout a part of the radial width of the ring at either side thereof to provide parallel seating surfaces which are inclined with respect to the axis of the ring.

2. A piston ring comprising a length of piston ring material reversely folded upon itself to present crowns and connecting web portions, said crowns comprising the top and bottom sides of the said ring, said ring having portions of its crowns and webs removed to provide a seating surface which is inclined with respect to the axis of the ring and which intersects the inner periphery thereof, said ring having crowns and webs at an opposite side thereof removed to provide a second sealing surface which is inclined with respect to the axis of the ring, and which intersects the outer periphery thereof.

3. A piston ring comprising a length of piston ring material reversely folded upon itself to present crowns and connecting web portions, said crowns comprising the top and bottom surfaces of the said ring and being inclined with respect to the axis of the ring, said crowns and webs being cut away throughout a portion of their radial length at opposite sides of the ring to present flat seating surfaces which are parallel to one another and which extend at right angles to the axis of the ring.

4. A piston ring comprising a strip of resilient piston ring material folded to form an annular body made up of crowns and connecting webs, said crowns and webs having portions thereof removed at opposite sides to provide a plurality of upstanding web portions which throughout a part of their radial width are connected by crowns at only one side of the ring.

5. A piston ring comprising a strip of resilient piston ring material reversely folded to provide an annular body made up of webs and connecting crowns, said crown portions extending throughout a portion only of the radial width of the ring at either side thereof, to provide a middle section in the ring composed entirely of separated web portions.

6. A piston ring comprising a length of piston ring material reversely folded upon itself to present crowns and connecting web portions, said crowns comprising upper and lower sides of the ring, the crowns at one side of the ring being inclined with respect to the axis of the ring and the crowns at the opposite side thereof being similarly inclined with respect to the axis of the ring, said crowns and webs being cut away throughout a portion of their radial length at opposite sides of the ring to present flat seating surfaces which extend at right angles to the axis of the ring, one of said flat seating surfaces intersecting the inner periphery of the ring and the other of said flat seating surfaces intersecting the outer periphery of the ring.

7. The combination of a piston having an inclined piston ring groove extending therearound, with a piston ring comprising a strip of piston ring material reversely folded upon itself, said piston ring being formed with radially extending crown portions and connecting web portions, said crown portions and web portions being cut away throughout a portion of their radial length to provide seating surfaces which extend angularly with respect to the axis of the ring, said seating surfaces adapted to engage against the said inclined piston ring groove of the piston, those portions of the webs from which crown portions have been removed being adapted to be collapsed upon one another upon exposure to gas pressure.

8. In combination, a piston having an inclined piston ring groove extending therearound, and a piston ring engaged in the piston groove and against the cylinder, said piston ring including a length of piston ring material reversely folded upon itself to provide a split ring body having upper and lower crown portions and connecting web portions, said crown portions and web portions being cut away throughout a portion of their radial length, parts of the web portions from which crown portions have been removed being adapted upon exposure to gas pressure to be collapsed throughout a part of their radial length, thereby to prevent passage of gas from the space between the piston and cylinder at one side of the ring to the same space at the opposite side of the ring.

THOMAS A. BOWERS.